(12) United States Patent
Przygienda et al.

(10) Patent No.: US 10,044,605 B2
(45) Date of Patent: Aug. 7, 2018

(54) APPARATUS, SYSTEM, AND METHOD FOR DISTRIBUTING ROUTING-PROTOCOL INFORMATION IN CLOS FABRICS

(71) Applicant: Juniper Networks, Inc., Sunnyvale, CA (US)

(72) Inventors: Antoni Bronislaw Przygienda, Sunnyvale, CA (US); Alia Karin Atlas, Arlington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 55 days.

(21) Appl. No.: 15/390,356

(22) Filed: Dec. 23, 2016

(65) Prior Publication Data

US 2018/0183706 A1   Jun. 28, 2018

(51) Int. Cl.
| | |
|---|---|
| *H04L 12/721* | (2013.01) |
| *H04L 12/753* | (2013.01) |
| *H04L 12/751* | (2013.01) |
| *H04L 12/933* | (2013.01) |

(52) U.S. Cl.
CPC .............. *H04L 45/26* (2013.01); *H04L 45/02* (2013.01); *H04L 45/025* (2013.01); *H04L 45/32* (2013.01); *H04L 45/48* (2013.01); *H04L 49/1515* (2013.01)

(58) Field of Classification Search
CPC ....... H04L 45/025; H04L 45/20; H04L 45/22; H04L 45/48; H04L 45/18; H04L 45/12; H04L 49/10
See application file for complete search history.

(56) References Cited

U.S. PATENT DOCUMENTS

| | | | | |
|---|---|---|---|---|
| 7,366,111 | B2 * | 4/2008 | Thubert | H04L 45/48 |
| | | | | 370/238 |
| 7,689,120 | B2 * | 3/2010 | Hoang | H04L 45/02 |
| | | | | 398/57 |
| 9,008,092 | B2 | 4/2015 | Thubert et al. | |
| 9,178,801 | B1 * | 11/2015 | Guichard | H04L 12/6418 |
| 9,450,817 | B1 * | 9/2016 | Bahadur | H04L 45/64 |

(Continued)

OTHER PUBLICATIONS

Gnawali et al., "The Minimum Rank with Hysteresis Objective Function"—RFC 6719, Sep. 2012, pp. 1-13. (Year: 2012).*

(Continued)

*Primary Examiner* — Redentor Pasia
(74) *Attorney, Agent, or Firm* — FisherBroyles, LLP

(57) ABSTRACT

The disclosed method may include (1) identifying, at a first node, a preconfigured level of the first node, (2) receiving, at the first node from a second node, a neighbor advertisement that includes a preconfigured level of the second node, (3) determining that a difference between the preconfigured level of the first node and the preconfigured level of the second node is equal to one, (4) recording, at the first node based on the difference being equal to one, an adjacency relationship between the first node and the second node, (5) transmitting a first type of routing-protocol packet from the first node to the second node based on the adjacency relationship, and (6) refraining from transmitting a second type of routing-protocol packet from the first node to the second node based on the adjacency relationship. Various other apparatuses, systems, and methods are also disclosed.

20 Claims, 11 Drawing Sheets

(56) References Cited

U.S. PATENT DOCUMENTS

| | | | | |
|---|---|---|---|---|
| 2012/0269096 | A1* | 10/2012 | Roskind | H04L 12/433 370/255 |
| 2014/0247726 | A1* | 9/2014 | Vasseur | H04L 45/04 370/236 |
| 2014/0376402 | A1 | 12/2014 | Dutt et al. | |
| 2015/0089081 | A1* | 3/2015 | Thubert | H04L 45/12 709/239 |
| 2017/0099218 | A1* | 4/2017 | Holcombe | H04L 45/70 |

OTHER PUBLICATIONS

Thubert, P.; Available Routing Constructs; https://datatracker.ietf.org/doc/html/draft-thubert-rtgwg-arc; Cisco Systems; Jan. 22, 2015.

Przygienda, T. et al; "RIFT: Routing in Fat Trees; draft-przygienda-rift-01.txt", Internet Engineering Task Force, IETF; Standardworkingdraft, Internet Society (ISOC) 4, Rue Des Falaises CH—1205 Geneva, Switzerland, Jan. 25, 2017, pp. 1-39, XP015117553.

Wen Lin, et al; Method, System, and Apparatus for Preventing Tromboning in Inter-Subnet Traffic Within Data Center Architectures; U.S. Appl. No. 15/079,250, filed Mar. 24, 2016.

Reji Thomas, et al; Method, System, and Apparatus for Proxying Intra-Subnet Traffic Across Multiple Interfaces Within Networks; U.S. Appl. No. 15/162,157, filed May 23, 2016.

Wikipedia—Interior gateway protocol; https://en.wikipedia.org/wiki/Interior_gateway_protocol, Jan. 27, 2004.

Wikipedia—Exterior Gateway Protocol; https://en.wikipedia.org/wiki/Exterior_Gateway_Protocol, Apr. 13, 2005.

Wikipedia—IS-IS; https://en.wikipedia.org/wiki/IS-IS, Nov. 27, 2003.

Bellman, Richard (1958). "On a routing problem". Quarterly of Applied Mathematics.

Dijkstra, E. W., "A Note on Two Problems in Connexion with Graphs", Journal Numer. Math., 1959.

Al-Fares, M., Loukissas, A. and A. Vandat, "A Scalable, Commodity Data Center Network Architecture", SIGCOMM, 2008.

Leiserson, C. E., "Fat-Trees: Universal Networks for Hardware-Efficient Supercomputing", 1985.

Yuan, X., "On Nonblocking Folded-Clos Networks in Computer Communication Environments", IEEE International Parallel & Distributed Processing Symposium, 2011.; http://dl.acm.org/citation.cfm?id=2059541.

Farrel, A., Vasseur, J.-P. and J. Ash, "A Path Computation Element (PCE)-Based Architecture", RFC 4655, DOI 10,17487/RFC4655, Aug. 2006.

Iyengar et al., J., "QUIC: A UDP-Based Multiplexed and Secure Transport", 2016.

David Oran, Editor, RFC1142—OSI IS-IS Intra-domain Routing Protocol, Feb. 1990.

S. Bradner, RFC2119—Key words for use in RFCs to Indicate Requirement Levels, Mar. 1997.

J. Moy, RFC2328—OSPF Version 2, Apr. 1998.

Y. Rekhter et al., RFC4271—A Border Gateway Protocol 4 (BGP-4), Jan. 2006.

T. Przygienda et al., RFC5120—M-ISIS: Multi Topology (MT) Routing in Intermediate System to Intermediate Systems (IS-ISs), Feb. 2008.

D. Katz, RFC5303—Three-Way Handshake for IS-IS Point-to-Point Adjacencies, Oct. 2008.

N. Shen et al. RFC5309—Point-to-Point Operation over LAN in Link State Routing Protocols, Oct. 2008.

D. Eastlake et al., RFC6234—US Secure Hash Algorithms (SHA and SHA-based HMAC and HKDF), May 2011.

S. Previdi et al., RFC6822—IS-IS Multi-Instance, Dec. 2012.

S. Previdi et al., RFC7855—Source Packet Routing in Networking (SPRING) Problem Statement and Requirements, May 2016.

P. Lapukhov et al., RFC7938—Use of BGP for Routing in Large-Scale Data Centers, Aug. 2016.

* cited by examiner

APPARATUS, SYSTEM, AND METHOD FOR DISTRIBUTING ROUTING-PROTOCOL INFORMATION IN CLOS FABRICS

BACKGROUND

Clos and Fat-Tree network topologies have gained prominence in today's networks (especially in today's data-center networks). A typical clos network may be a highly-connected multistage network in which nodes at each stage are connected to all nodes in each prior and/or subsequent stages. For example, a typical three-stage clos network may include three stages of nodes in which the nodes in the middle stage are connected to all nodes in the ingress and egress stages of the network. A typical fat-tree network may be considered a special folded form of a clos network that is configured using a leaf-spine topology. In a typical fat-tree network, each leaf node in the network (i.e., each node at the lowest level in the network) may be connected to each spine node in the network (i.e., each node at the highest level in the network). For example, a typical three-level fat-tree network may include two or more branches (or Points of Delivery (PoDs)) that each have a clos-network topology. In each branch of the three-level fat-tree network, each leaf node may be connected to each middle-level node in the branch, and each middle-level node may be connected to each spine in the network.

Unfortunately, existing underlay routing protocols (e.g., the Open Shortest Path First (OSPF) routing protocol, the Intermediate System to Intermediate System (IS-IS) routing protocol, the Enhanced Interior Gateway Routing Protocol (EIGRP), and the Border Gateway Protocol (BGP)) have typically been geared towards networks with irregular topologies and low degrees of connectivity as compared to typical clos networks. The lack of underlay routing solutions that natively address highly-connected clos networks has led many data-center operators to create alternative routing-protocol solutions by haphazardly modifying existing protocols, with mixed results overall. The instant disclosure, therefore, identifies and addresses a need for systems and methods for distributing routing-protocol information in clos fabrics.

SUMMARY

As will be described in greater detail below, the instant disclosure generally relates to apparatuses, systems, and methods for distributing routing-protocol Information in clos fabrics. In one example, an apparatus for accomplishing such a task may include (1) a storage device that stores routing-protocol information and (2) at least one physical processor communicatively coupled to the storage device at a first node within a clos network. In some examples, the physical processor may (1) identify, at the first node in the clos network, a preconfigured level of the first node in the clos network, (2) receive, at the first node from a second node in the clos network, a neighbor advertisement that includes a preconfigured level of the second node in the clos network, (3) determine, at the first node, that a difference between the preconfigured level of the first node and the preconfigured level of the second node is equal to one, (4) record, to the storage device at the first node based on determining that the difference is equal to one, an adjacency relationship between the first node and the second node, (5) transmit a first type of routing-protocol packet from the first node to the second node based on the adjacency relationship, and (6) refrain from transmitting a second type of routing-protocol packet from the first node to the second node based on the adjacency relationship.

Similarly, a system incorporating the above-described apparatus may include (1) an identifying module, stored in memory, that identifies, at a first node in a clos network, a preconfigured level of the first node in the clos network, (2) a receiving module, stored in memory, that receives, at the first node from a second node in the clos network, a neighbor advertisement that includes a preconfigured level of the second node in the clos network, (3) a determining module, stored in memory, that determines, at the first node, that a difference between the preconfigured level of the first node and the preconfigured level of the second node is equal to one, (4) a recording module, stored in memory, that records, at the first node based on determining that the difference is equal to one, an adjacency relationship between the first node and the second node, (5) a transmitting module, stored in memory, that (a) transmits a first type of routing-protocol packet from the first node to the second node based on the adjacency relationship and (b) refrains from transmitting a second type of routing-protocol packet from the first node to the second node based on the adjacency relationship, and (6) at least one physical processor that executes the identifying module, the receiving module, the determining module, the recording module, and the transmitting module.

A corresponding method may include (1) identifying, at a first node in a clos network, a preconfigured level of the first node in the clos network, (2) receiving, at the first node from a second node in the clos network, a neighbor advertisement that includes a preconfigured level of the second node in the clos network, (3) determining, at the first node, that a difference between the preconfigured level of the first node and the preconfigured level of the second node is equal to one, (4) recording, at the first node based on determining that the difference is equal to one, an adjacency relationship between the first node and the second node, (5) transmitting a first type of routing-protocol packet from the first node to the second node based on the adjacency relationship, and (6) refraining from transmitting a second type of routing-protocol packet from the first node to the second node based on the adjacency relationship.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
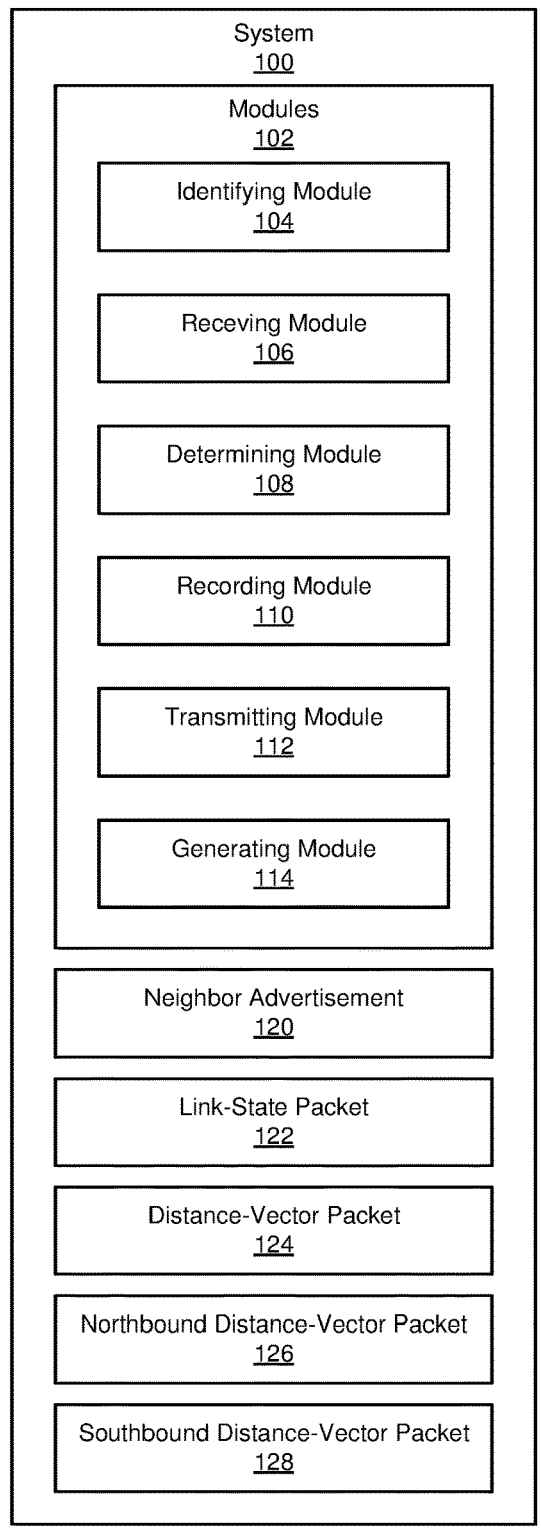
FIG. 1 is a block diagram of an exemplary system for distributing routing-protocol Information in clos fabrics.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for distributing routing-protocol Information in clos fabrics. as will be explained in greater detail below, by generally propagating link-state information only towards the spines in a fat-tree network and distance-vector information only towards the leafs in the fat-tree network, embodiments of the instant disclosure may reduce the amount of routing information and state that must be exchanged and maintained by the nodes in the fat-tree network in order to identify paths within the fat-tree network. Embodiments of the instant disclosure may also provide various other advantages and features, as discussed in greater detail below.

Figure 2:
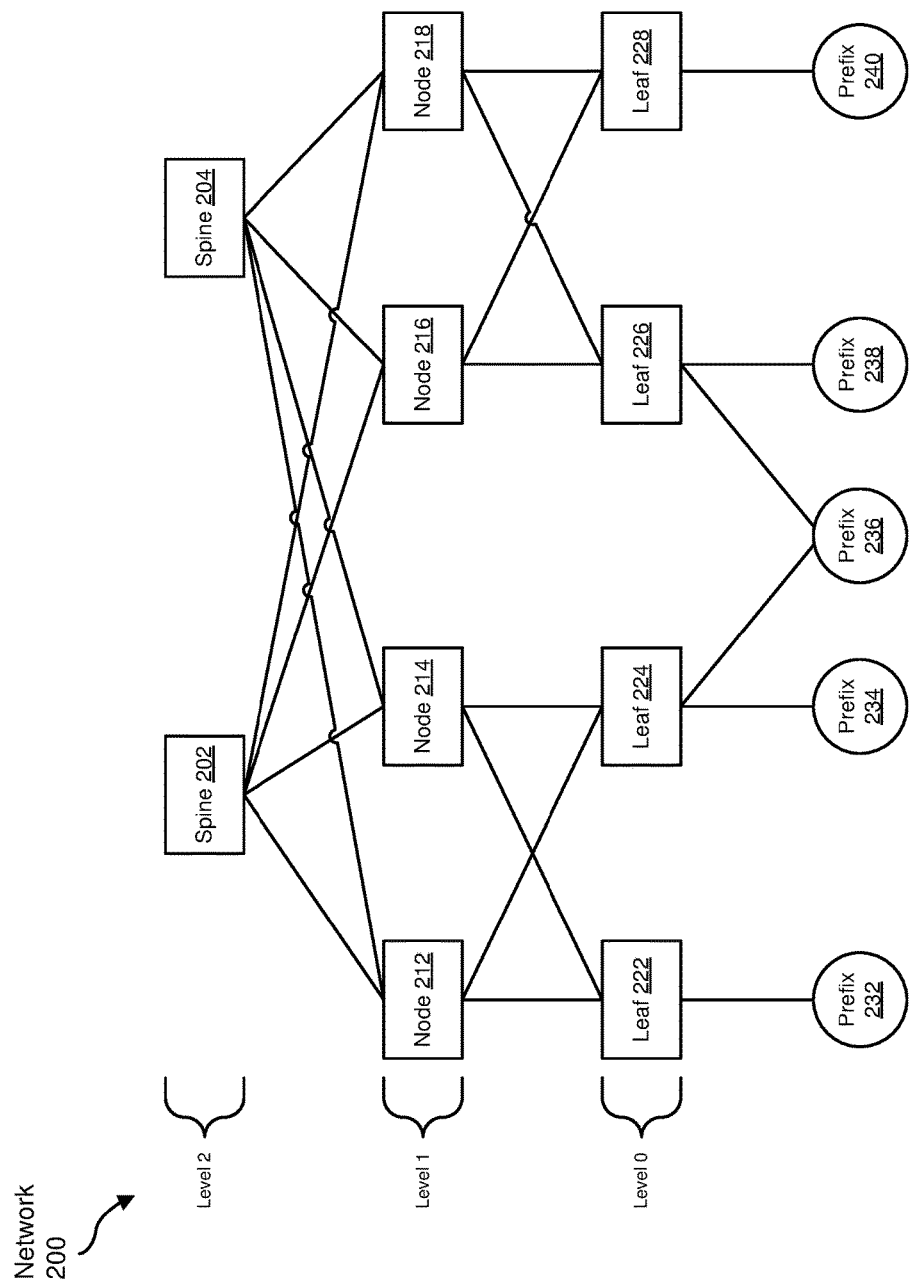
FIG. 2 is a block diagram of an exemplary network for distributing routing-protocol Information in clos fabrics.

The following will provide, with reference to FIGS. 1-2, detailed descriptions of example systems for distributing routing-protocol information in clos fabrics. Detailed descriptions of corresponding computer-implemented methods will also be provided in connection with FIGS. 3-10. In addition, detailed descriptions of an example computing system capable of implementing one or more of the embodiments described herein will be provided in connection with FIG. 11.

FIG. 1 is a block diagram of an exemplary system 100 for distributing routing-protocol Information in clos fabrics. as illustrated in this figure, exemplary system 100 may include one or more modules 102 for performing one or more tasks. For example, and as will be explained in greater detail below, exemplary system 100 may include an identifying module 104 that identifies, at a first node in a clos network, a preconfigured level of the first node in the clos network. Exemplary system 100 may also include a receiving module 106 that receives, at the first node from a second node in the clos network, a neighbor advertisement that includes a preconfigured level of the second node in the clos network. Exemplary system 100 may further include a determining module 108 that determines, at the first node, that a difference between the preconfigured level of the first node and the preconfigured level of the second node is equal to one, and a recording module 110 that records, at the first node based on determining that the difference is equal to one, an adjacency relationship between the first node and the second node.

In addition, and as will be described in greater detail below, exemplary system 100 may include a transmitting module 112 that (a) transmits a first type of routing-protocol packet from the first node to the second node based on the adjacency relationship and (b) refrains from transmitting a second type of routing-protocol packet from the first node to the second node based on the adjacency relationship. In some examples, exemplary system 100 may also include a generating module 114 that generates the various routing-protocol packets described herein. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., spine 202, spine 204, node 212, node 214, node 216, node 218, leaf 222, leaf 224, leaf 226, and leaf 228) and/or computing system 1100 in FIG. 11. One or more of modules 102 in FIG. 1 may also represent all or portions of one or more special-purpose computers configured to perform one or more tasks. As illustrated in FIG. 1, example system 100 may also include one or more routing-protocol packets, such as neighbor advertisement 120, link-state packet 122, distance-vector packet 124, northbound distance-vector packet 126, and southbound distance-vector packet 128.

Exemplary system 100 in FIG. 1 may be implemented in a variety of ways. For example, all or a portion of exemplary system 100 may represent portions of exemplary network 200 in FIG. 2. As shown in FIG. 2, network 200 may include a spine 202, a spine 204, a node 212, a node 214, a node 216, a node 218, a leaf 222, a leaf 224, a leaf 226, and a leaf 228. In some examples, each node in exemplary network 200 may be programmed with one or more of modules 102. As shown in FIG. 2, exemplary network 200 may be a fat-tree network. While the examples provided herein illustrate the disclosed systems and methods functioning within a fat-tree network, the systems and methods disclosed herein may also function within any network with a regular, highly-connected topology: such as a folded-butterfly, banyan, or omega network.

In one embodiment, one or more of modules 102 from FIG. 1 may, when executed by at least one processor of each node in exemplary network 200, cause each node in exemplary network 200 to distribute routing-protocol information in exemplary network 200. For example, and as will be described in greater detail below, one or more of modules 102 may cause node 212 to (1) identify a preconfigured level of node 212, (2) receive, at node 212 from spine 202, a neighbor advertisement that includes a preconfigured level of spine 202, (3) determine, at node 212, that the preconfigured level of node 212 is one level lower than the preconfigured level of spine 202, (4) record, at node 212 based on determining that the preconfigured level of node 212 is one level lower than the preconfigured level of spine 202, an adjacency relationship between node 212 and spine 202, (5) transmit northbound routing-protocol packets from node 212 to spine 202 based on the adjacency relationship, and (6) refrain from transmitting southbound routing-protocol packets from node 212 to spine 202 based on the adjacency relationship.

In another example, one or more of modules 102 may cause node 212 to (1) identify a preconfigured level of node 212, (2) receive, at node 212 from leaf 222, a neighbor advertisement that includes a preconfigured level of leaf 222, (3) determine, at node 212, that the preconfigured level of node 212 is one level higher than the preconfigured level of leaf 222, (4) record, at node 212 based on determining that the preconfigured level of node 212 is one level higher than the preconfigured level of leaf 222, an adjacency relationship between node 212 and leaf 222, (5) transmit southbound routing-protocol packets from node 212 to leaf 222 based on the adjacency relationship, and (6) refrain from transmitting northbound routing-protocol packets from node 212 to leaf 222 based on the adjacency relationship.

Spine 202, spine 204, node 212, node 214, node 216, node 218, leaf 222, leaf 224, leaf 226, and leaf 228 each generally represents any type or form of device, system, and/or mechanism that facilitates communication and/or network traffic across data centers and/or networks. In one example, spine 202, spine 204, node 212, node 214, node 216, node 218, leaf 222, leaf 224, leaf 226, and leaf 228 may each represent a router (such as a gateway router). In this example, spine 202, spine 204, node 212, node 214, node 216, node 218, leaf 222, leaf 224, leaf 226, and leaf 228 may each facilitate and/or support Layer 3 routing as well as forward Layer 2 and/or Layer 3 traffic. Examples of spine 202, spine 204, node 212, node 214, node 216, node 218, leaf 222, leaf 224, leaf 226, and/or leaf 228 include, without limitation, routers, gateways, switches, hubs, modems, bridges, repeaters, multiplexers, network adapters, network interfaces, network racks, servers, computing devices, virtual machines running on one or more of the same, portions of one or more of the same, combinations or variations of one or more of the same, and/or any other suitable spine nodes. As used herein, the terms "leaf" and "leaf node" generally refer to any node at the lowest level of a fat-tree network that may be connected exclusively by the means of northbound links to a spine. As used herein, the terms "spine" and "spine node" generally refer to any node at the highest level of a fat-tree network that may have only southbound links.

As shown in FIG. 2, exemplary network 200 may be configured as a fat-tree network with three levels of nodes and two branches. In this example, leaf 222, leaf 224, leaf 226, and leaf 228 may represent nodes at the lowest level of exemplary network 200 (i.e., level 0 of network 200); node 212, node 214, node 216, and node 218 may represent nodes at the middle level of exemplary network 200 (i.e., level 1 of network 200); and spine 202 and spine 204 may represent nodes at the highest level of exemplary network 200 (i.e., level 2 of network 200). Additionally, node 212, node 214, leaf 222, and leaf 224 may represent nodes in the left branch of exemplary network 200; and node 216, node 218, leaf 226, and leaf 228 may represent nodes in the right branch of exemplary network 200. As shown in FIG. 2, each level-1 node may be connected to each level-2 node, and each level-0 node may be connected to each level-1 node in the same branch as the level-0 node.

As shown in FIG. 2, various network prefixes may be reachable via the level-0 nodes in FIG. 2. For example, prefix 232 may be reachable via leaf 222, prefix 234 may be reachable via leaf 224, prefix 236 may be reachable via leaf 224 or leaf 226, prefix 238 may be reachable via leaf 226, and prefix 240 may be reachable via leaf 228. As used herein, the term "prefix" generally refers to any Internet Protocol (IP) address and/or subnet mask that defines a network destination (e.g., an address of a network, a subnetwork, or host) to which data may be routed. Prefixes may be stored in a node's routing table, and each may be associated with one or more next-hop nodes through which the prefix may be reached. When a packet of data that is destined to a particular address is received at a node in a network, the node may determine which next-hop node to pass the data by determining the longest prefix in its routing table that matches the particular address and by passing the packet to a next-hop node associated with the longest prefix.

Figure 3:
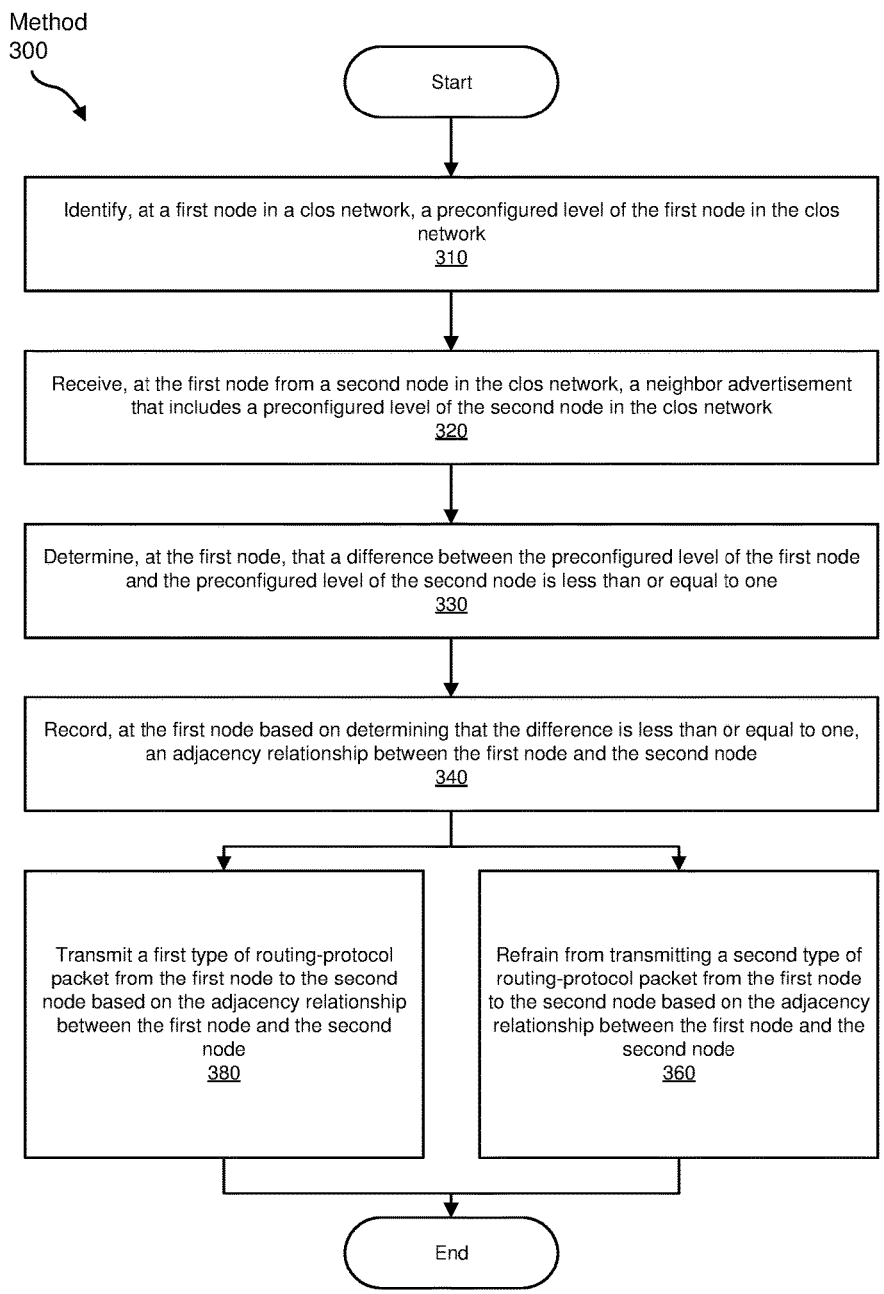
FIG. 3 is a flow diagram of an exemplary method for distributing routing-protocol Information in clos fabrics.

FIG. 3 is a flow diagram of an exemplary computer-implemented method 300 for distributing routing-protocol Information in clos fabrics. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, and/or computing system 1100 in FIG. 11.

As illustrated in FIG. 3, at step 310 one or more of the systems described herein may identify, at a first node in a clos network, a preconfigured level of the first node in the clos network. For example, identifying module 104 may, as part of node 212 in FIG. 2, identify a preconfigured level of node 212.

The systems described herein may perform step 310 in any suitable manner. In general, the systems and methods described herein may enable each node in a fat-tree network to be preassigned to a single level (or layer) in the fat-tree network, and identifying module 104 may identify the level to which a node has been assigned by reading configuration details associated with the node. In one example, the systems and methods described herein may enable a node to be configured with a single numerical value that indicates a level in the fat-tree network at which the node should operate. For example, the systems and methods described herein may enable a node to be assigned a level of 0, 1, 2, 3, et cetera. In some examples, a level of 0 may indicate that a node is a leaf node at a network's lowest or most southern level, and each successively higher level number may indicate that a node is at a successively higher or more northern level of the network. Using FIG. 2 as an example, leaf 222, leaf 224, leaf 226, and leaf 228 may each have been preconfigured with a level of 0; node 212, node 214, node 216, and node 218 may each have been preconfigured with a level of 1; and spine 202 and spine 204 may each have been preconfigured with a level of 2.

In some examples, the systems and methods described herein may enable a node to be preconfigured or manufactured with a default level (e.g., 0) in order to simplify the deployment of a particular level of node. In other examples, the systems and methods described herein may enable an administrator to assign a level to a node. Generally, a node's assigned level is not related to or affected by how the node is physically connected to other nodes. As such, a node's level in a network may not be affected by miscabling (e.g., mistakenly cabling a node at level 0 to a node at level 2 may not affect the predetermined levels of either node).

At step 320, one or more of the systems described herein may receive, at the first node from a second node in the clos network, a neighbor advertisement that includes a preconfigured level of the second node in the clos network. For example, receiving module 106 may, as part of node 212 in FIG. 2, receive, from spine 202, a neighbor advertisement that includes the preconfigured level of spine 202.

The systems described herein may perform step 320 in any suitable manner. In general, each node in a network may periodically broadcast neighbor advertisements to its neighbors (i.e., the nodes to which the node is directly connected), and receiving module 106 may, as part of a specific node, periodically receive neighbor advertisements from the node's neighbors. As used herein, the term "neighbor advertisement" generally refers to a routing-protocol packet (e.g., HELLO packets from the OSPF routing protocol) that may be sent from a node in a network to the node's neighbors and that may enable the node's neighbors to discover the node and/or information about the node. In some examples, a neighbor advertisement may include an identifier of the node, the node's preconfigured level, and/or any other information that may describe the node.

Figure 4:
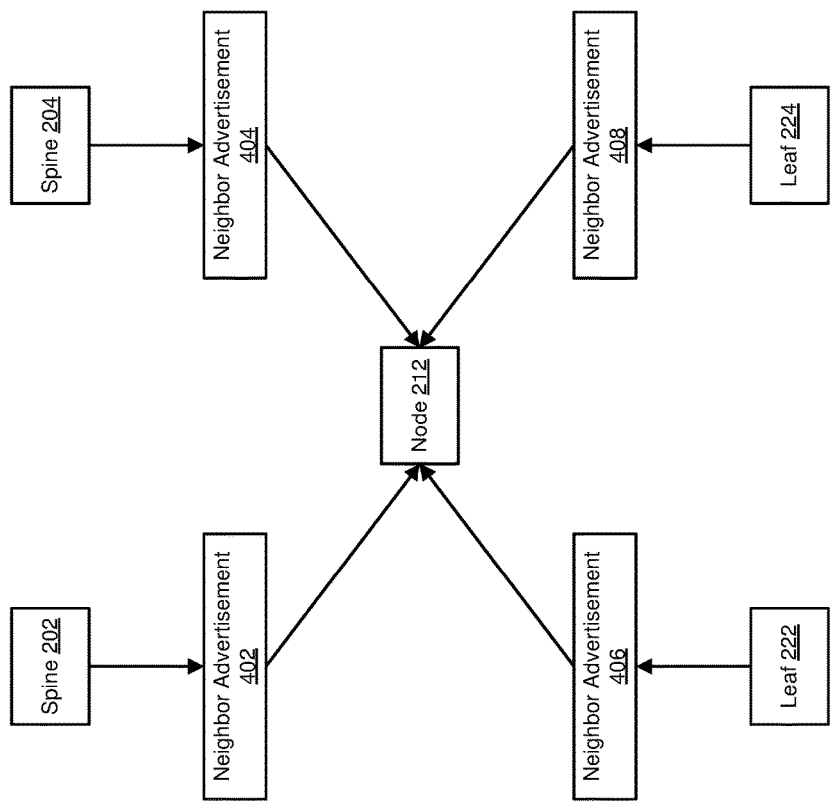
FIG. 4 is a flow diagram of an exemplary exchange of routing-protocol packets.

Using FIG. 4 as an example, spine 202, spine 204, leaf 222, and leaf 224 may periodically send neighbor advertisements 402, 404, 406, and 408, respectively, to node 212; and receiving module 106 may, as part of node 212, receive neighbor advertisements 402, 404, 406, and 408. In this example, neighbor advertisement 402 may include an identifier of spine 202 and the preconfigured level of spine 202 (in this example level 2); neighbor advertisement 404 may include an identifier of spine 204 and the preconfigured level of spine 204 (in this example level 2); neighbor advertisement 406 may include an identifier of leaf 222 and the preconfigured level of leaf 222 (in this example level 0); and neighbor advertisement 408 may include an identifier of leaf 224 and the preconfigured level of leaf 224 (in this example level 0).

At step 330, one or more of the systems described herein may determine, at the first node, that a difference between the preconfigured level of the first node and the preconfigured level of the second node is less than or equal to one. For example, determining module 108 may, as part of node 212 in FIG. 2, determine that the difference between the preconfigured level of node 212 and the preconfigured level of leaf 222 is equal to one. At step 340, one or more of the systems described herein may record, at the first node based on determining that the difference is less than or equal to one, an adjacency relationship between the first node and the second node. For example, recording module 110 may, as part of node 212 in FIG. 2, record an adjacency relationship between node 212 and spine 202 based on determining that the difference between the preconfigured level of node 212 and the preconfigured level of spine 202 is less than or equal to one.

The systems described herein may perform steps 330 and 340 in any suitable manner. In general, determining module 108 may, as part of a node, compare the preconfigured level of the node to the preconfigured levels of the node's neighbors (i.e., nodes from which a neighbor advertisement has been received) in order to identify one or more nodes with which the node has an adjacency relationship, and recording module 110 may record each of the node's identified adjacency relationships. As will be explained in greater detail below, the systems and methods described herein may use an adjacency relationship between two nodes to determine how to exchange routing information between the two nodes. As used herein, the term "adjacency relationship" generally refers to a relationship that is formed between two neighboring nodes in a network whose preconfigured levels are the same or differ by one. Each of a node's adjacency relationships may be one of three types: northbound adjacency relationships, southbound adjacency relationships, and east/west adjacency relationships. An adjacency relationship between two nodes whose preconfigured levels are equal may be considered as an east/west adjacency relationship by both nodes. An adjacency relationship between two nodes whose preconfigured levels differ by one may be considered as a southbound adjacency relationship by the node with the higher preconfigured level and as a northbound adjacency relationship by the node with the lower preconfigured level. In at least one example, the systems and methods disclosed herein may only form an adjacency relationship between two nodes if the two nodes are in the same PoD.

Using FIG. 4 as an example, node 212 may have four adjacency relationships: an adjacency relationship with spine 202, an adjacency relationship with spine 204, an adjacency relationship with leaf 222, and an adjacency relationship with leaf 224. In this example, the adjacency relationships with spine 202 and spine 204 may be considered northbound adjacency relationships by node 212, and the adjacency relationships with leaf 222 and leaf 224 may be considered southbound adjacency relationships by node 212.

In some examples, a node may have a neighbor whose preconfigured level is greater than 1 level higher or lower than the preconfigured level of the node itself. For example, a leaf node with a preconfigured level of 0 may have been misconnected to a spine node at level 2. In these examples, the systems and methods described herein may not create an adjacency relationship between two such nodes and may refrain from exchanging any routing-protocol packets between the nodes. By generating and using adjacency relationships in this manner, the systems and methods disclosed herein may automatically construct fat-tree topologies in a way that is not affected by miscabling of nodes.

At steps 350 and 360, one or more of the systems described herein may transmit a first type of routing-protocol packet from the first node to the second node based on the adjacency relationship while also refraining from transmitting a second type of routing-protocol packet from the first node to the second node based on the adjacency relationship. For example, transmitting module 112 may, as part of node 212 in FIG. 2, transmit northbound routing-protocol packets from node 212 to spine 202 while also refraining from transmitting southbound routing-protocol packets from node 212 to spine 202 based on the adjacency relationship of node 212 to spine 202.

As used herein, the term "routing-protocol packet" generally refers to any information exchanged between two or more nodes in a network that enables one of the nodes to identify paths (e.g., shortest paths) through the network by which data may be routed to any network destination. Examples of routing-protocol packets include, without limitation, link-state packets (which may be similar to link-state advertisements of the OSPF routing protocol and link-state packets of the IS-IS routing protocol) and distance-vector packets (which may be similar to distance vectors of the BGP routing protocol).

As used herein, the term "link-state packet" generally refers to any information that is exchanged between two nodes in a network and that describes a node's adjacency relationships, the prefixes that are reachable via the node, the preconfigured level of the node, and/or any other information about the node (e.g., special capabilities such as flood-reduction capabilities). Conventional link-state routing protocols (e.g., OSPF and IS-IS) may (1) cause each node in a network to broadcast link-state packets to its neighbors that describe the node's own adjacency relationships and the prefixes that are reachable via the node and (2) cause every other node in the network to flood north and south each received link-state packet such that the link-state packets of each node in the network are propagated to every other node in the network. After each node in the network has received the link-state packets of the other nodes in the network, each node in the network may have a complete picture of the network's topology, and conventional link-state routing protocols may cause each node in the network to compute a shortest-path tree for each prefix in the network. As will be explained in greater detail below, unlike conventional link-state routing protocols, the systems and methods described herein may flood link-state packets only in a northbound direction from nodes at lower levels in a fat-tree network to nodes at higher levels in the fat-tree network while refraining from flooding link-state packets in a southbound direction from nodes at higher levels in the fat-tree network to nodes at lower levels in the fat-tree network. In this way, the systems and methods described herein may reduce the amount of routing-protocol traffic on the fat-tree network and the amount of link-state information that must be maintained by each node in the network. After a node that is at a particular level in the fat-tree network has received the link-state packets of each lower-level node in the fat-tree network, the node may have a complete picture of the fat-tree network's topology that is below the particular level, and the systems and methods described herein may cause the node to compute a shortest-path tree for each prefix in this part of the fat-tree network.

As used herein, the term "distance-vector packet" generally refers to any information that is sent by one node in a network to its neighbors that describes the prefixes that are reachable via the node and/or a cost of a path to the prefix. Conventional distance-vector routing protocols (e.g., BGP and EIGRP) may cause a node in a network to (1) determine what prefixes are reachable via the node (perhaps via distance-vector packets that are received from the nodes neighbors) and (2) transmit distance-vector packets to its neighbors that describe the prefixes that are reachable via the node. When a node receives a distance-vector packet from its neighbor, the node may store the prefix described in the distance-vector packet in the node's routing table with the next-hop node associated with the prefix as the neighbor. As will be explained in greater detail below, unlike conventional distance-vector routing protocols, the systems and methods described herein may generally transmit distance-vector packets only in a southbound direction from nodes at higher levels in a fat-tree network to nodes at lower levels in the fat-tree network while refraining from transmitting distance-vector packets in a northbound direction from nodes at lower levels in the fat-tree network to nodes at higher levels in the fat-tree network. By propagating distance-vector packets rather than link-state packets in the southbound direction, the systems and methods described herein may reduce the amount of link-state information that must be maintained by lower-level nodes in a fat-tree network.

In general, the routing-protocol packets described herein may be designated as either northbound routing-protocol packets (i.e., routing-protocol packets that should be sent only from a node at a lower level in a fat-tree network to a node at a higher level in the fat-tree network) or southbound routing-protocol packets (i.e., routing-protocol packets that should be sent only from a node at a higher level in a fat-tree network to a node at a lower level in the fat-tree network).

In some examples, the systems and methods described herein may designate link-state packets as northbound routing-protocol packets. In these examples, transmitting module 112 may transmit link-state packets along a node's northbound adjacency relationships while refraining from transmitting link-state packets along the node's southbound adjacency relationships. By transmitting link-state packets only in a northbound direction within a fat-tree network, the systems and methods described herein may enable nodes at a particular level in the fat-tree network to (1) gain a picture of the topology of the fat-tree network below that level and (2) compute shortest-path routes to prefixes that are reachable via lower-level nodes in the fat-tree network.

Figure 5:
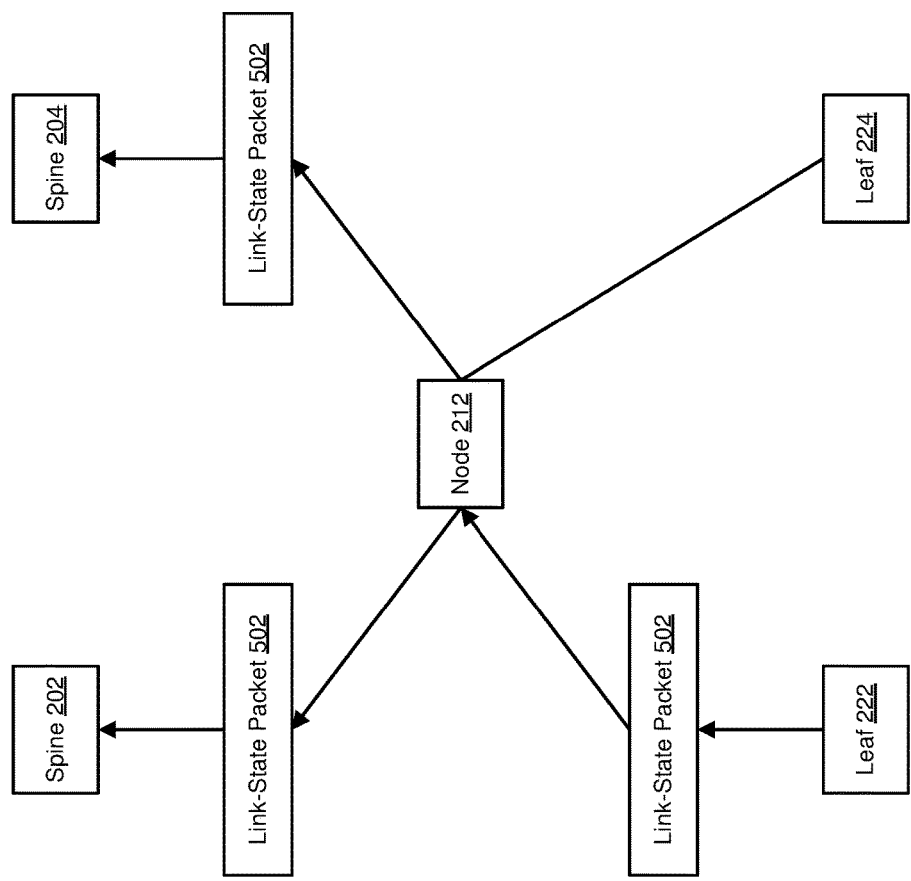
FIG. 5 is a flow diagram of an exemplary exchange of routing-protocol packets.

Using FIG. 5 as an example, generating module 114 may, as part of leaf 222, generate a link-state packet 502 that describes the adjacency relationships of leaf 222 and/or the prefixes that are reachable via leaf 222, and transmitting module 112 may, as part of leaf 222, transmit link-state packet 502 to the nodes in network 200 with which leaf 222 has a northbound adjacency relationship (i.e., node 212 and node 214). In this example, receiving module 106 may, as part of node 212, receive link-state packet 502 from leaf 222. Since link-state packet 502 has been designated as a northbound routing-protocol packet, transmitting module 112 may, as part of node 212, flood link-state packet 502 along the northbound adjacency relationships of node 212 while refraining from flooding link-state packet 502 along the southbound adjacency relationships of node 212. For example, as shown in FIG. 5, transmitting module 112 may, as part of node 212, transmit link-state packet 502 to spine 202 and spine 204 while refraining from transmitting link-state packet 502 to leaf 224.

In some examples, the systems and methods described herein may designate link-state packets as routing-protocol packets that may be transmitted southbound by nodes that originate the link-state packets but only flooded or reflected northbound by nodes that receive the link-state packets (i.e., any node that receives a link-state packet will refrain from flooding the link-state packet along its southbound adjacency relationships). In these examples, transmitting module 112 may flood or reflect any link-state packets that are received at a node from a northbound adjacency relationship along the node's northbound adjacency relationships while refraining from flooding or reflecting the link-state packets along the node's southbound adjacency relationships. By reflecting link-state packets received from a node's northbound adjacency relationship along the node's other northbound adjacency relationships, the systems and methods described herein may enable the nodes with which the node has northbound adjacency relationships to discover and learn about each other. By reflecting link-state packets that have been received from a node at a higher level in a fat-tree network in a northbound direction to other nodes at the higher level, the systems and methods described herein may enable nodes at the higher level to gain a picture of the topology of the fat-tree network at the higher level.

Figure 6:
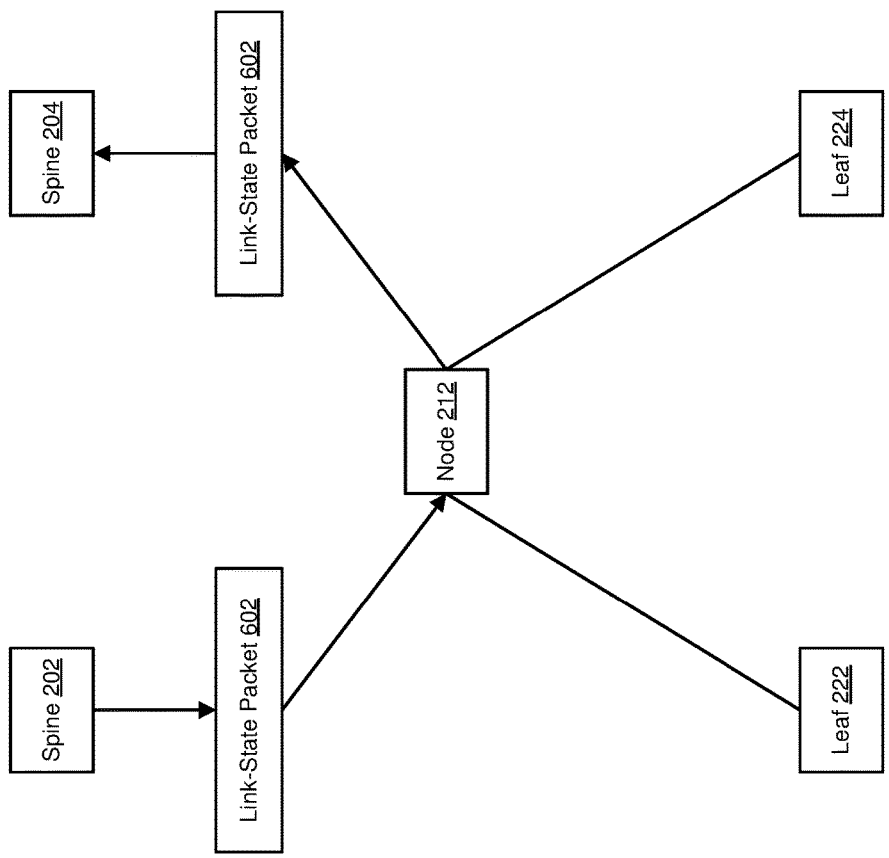
FIG. 6 is a flow diagram of an exemplary exchange of routing-protocol packets.

Using FIG. 6 as an example, generating module 114 may, as part of spine 202, generate a link-state packet 602 that describes the adjacency relationships of spine 202 and/or the prefixes that are reachable via spine 202, and transmitting module 112 may, as part of spine 202, transmit link-state packet 602 to the nodes in network 200 with which spine 202 has a southbound adjacency relationship (i.e., node 212, node 214, node 216, and node 218). In this example, receiving module 106 may, as part of node 212, receive link-state packet 602 from spine 202. Since link-state packet 602 has been designated as a routing-protocol packet that may be transmitted southbound but only flooded or reflected northbound, transmitting module 112 may, as part of node 212, reflect link-state packet 602 along the northbound adjacency relationships of node 212 while refraining from flooding link-state packet 602 along the southbound adjacency relationships of node 212. For example, as shown in FIG. 6, transmitting module 112 may, as part of node 212, transmit link-state packet 602 to spine 204 while refraining from transmitting link-state packet 602 to leaf 222 or leaf 224.

In some examples, the systems and methods described herein may designate distance-vector packets as southbound routing-protocol packets. In these examples, transmitting module 112 may transmit distance-vector packets along a node's southbound adjacency relationships while refraining from transmitting distance-vector packets along the node's northbound adjacency relationships. In general, generating module 114 may, as part of each node in a fat-tree network, independently originate a distance-vector packet that indicates a default prefix (e.g., "0/0") and possibly one or more disaggregated prefixes that are reachable via the node, and transmitting module 112 may transmit the distance-vector packet along the node's southbound adjacency relationships while refraining from transmitting the distance-vector packet along the node's northbound adjacency relationships.

Figure 7:
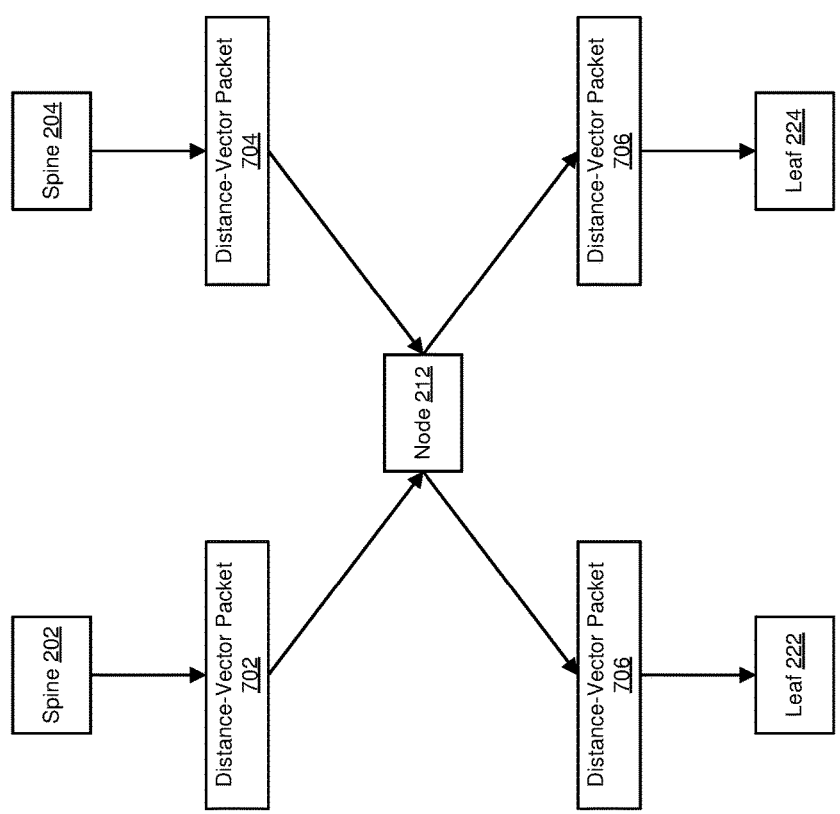
FIG. 7 is a flow diagram of an exemplary exchange of routing-protocol packets.

Using FIG. 7 as an example, generating module 114 may, as part of spine 202, originate a distance-vector packet 702 that describes at least a default prefix that is reachable via spine 202, and transmitting module 112 may, as part of spine 202, transmit distance-vector packet 702 to the nodes in network 200 with which spine 202 has a southbound adjacency relationship (i.e., node 212, node 214, node 216, and node 218). Similarly, generating module 114 may, as part of spine 204, originate a distance-vector packet 704 that describes at least a default prefix that is reachable via spine 204, and transmitting module 112 may, as part of spine 204, transmit distance-vector packet 704 to the nodes in network 200 with which spine 204 has a southbound adjacency relationship (i.e., node 212, node 214, node 216, and node 218). In this example, receiving module 106 may, as part of node 212, receive distance-vector packet 702 from spine 202 and distance-vector packet 704 from spine 204. Generating module 114 may, as part of node 212, originate a distance-vector packet 706 that describes at least a default prefix that is reachable via node 212, and transmitting module 112 may, as part of node 212, transmit distance-vector packet 706 to the nodes in network 200 with which node 212 has a southbound adjacency relationship (i.e., leaf 222 and leaf 224) while refraining from transmitting distance-vector packet 706 to the nodes in network 200 with which node 212 has a northbound adjacency relationship (i.e., spine 202 and spine 204). In this example, the originations and transmissions of distance-vector packet 702, distance-vector packet 704, and distance-vector packet 706 may have occurred in any order (i.e., there may be no causal connection between the originations and transmissions of distance-vector packet 702, distance-vector packet 704, and distance-vector packet 706).

Figure 8:
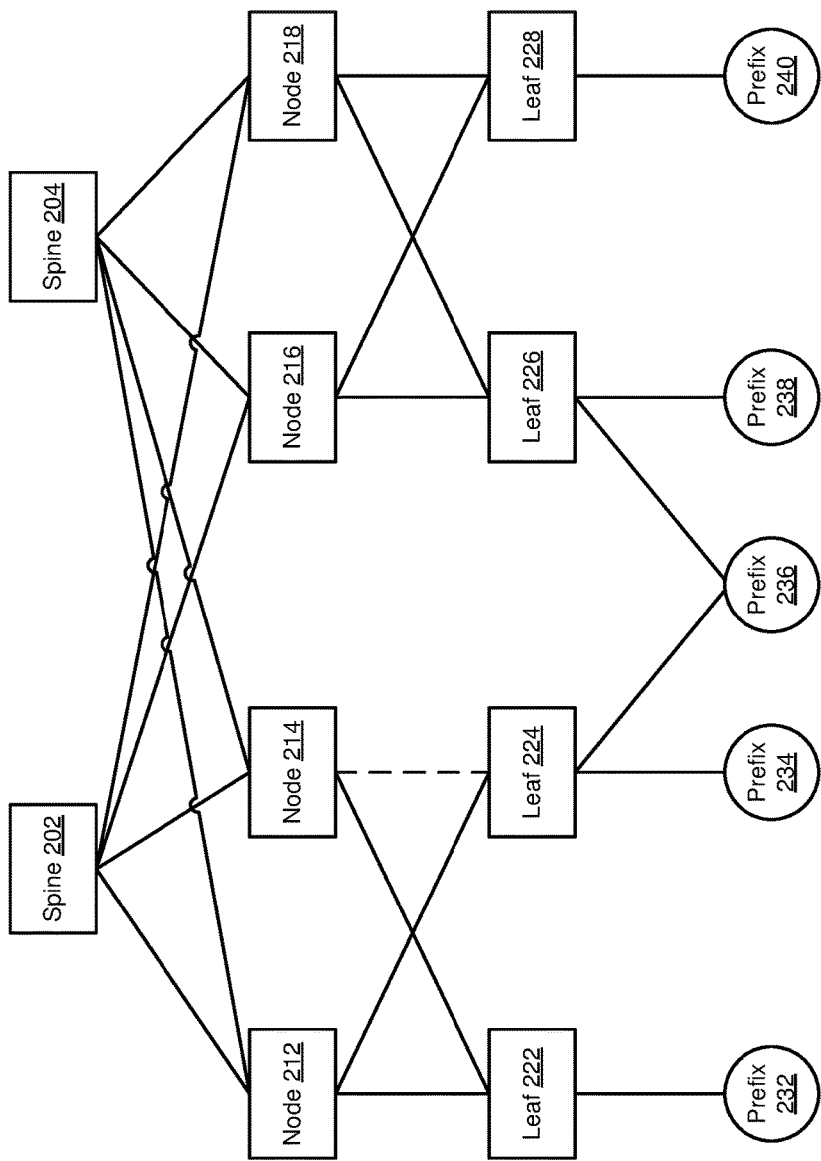
FIG. 8 is a flow diagram of an exemplary exchange of routing-protocol packets.
Figure 9:
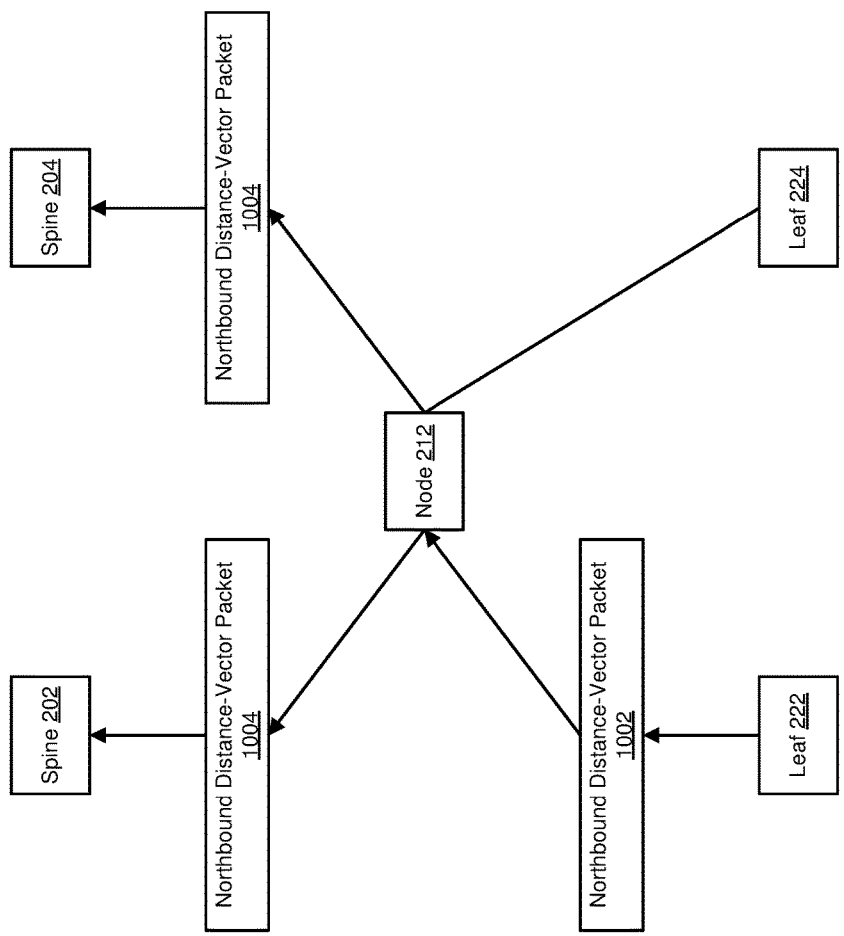
FIG. 9 is a flow diagram of an exemplary exchange of routing-protocol packets.
Figure 10:
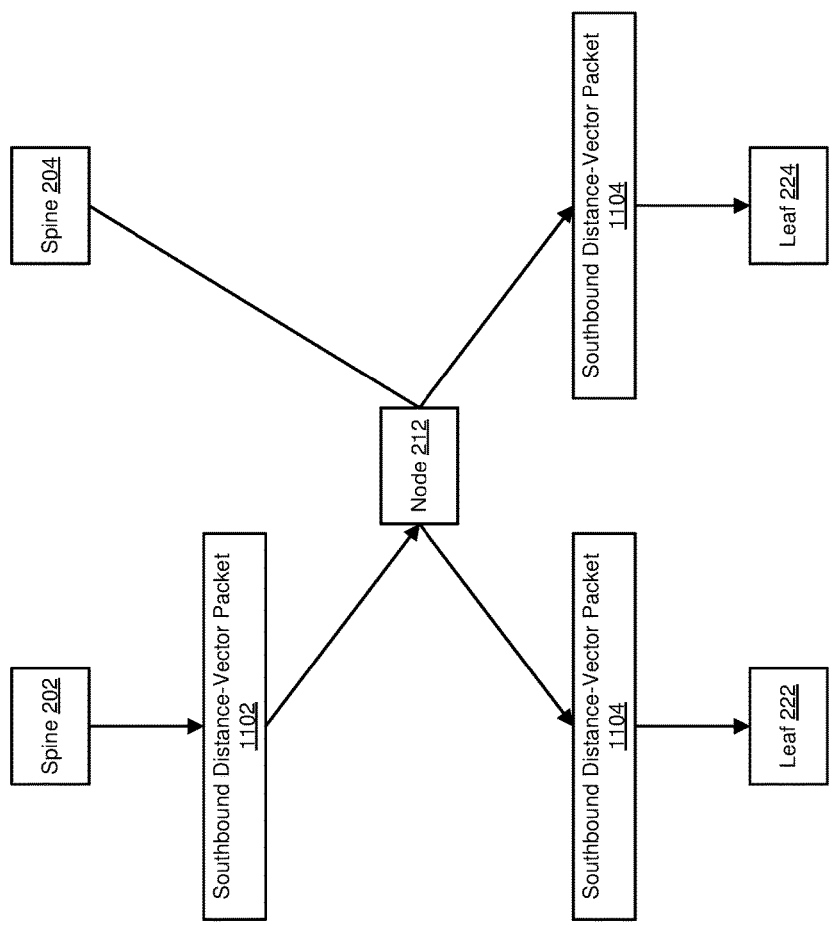
FIG. 10 is a block diagram of an exemplary system for distributing routing-protocol Information in clos fabrics.

The way in which the systems and methods described herein distribute routing-protocol packets in clos fabrics may enable various operations to be performed, such as automatic disaggregation of prefixes and/or load-balancing of link-state-advertisement flooding. As indicated above, the systems and methods described herein may cause each node in a fat-tree network to transmit a distance-vector packet that describes at least a default prefix ("0/0") that is reachable via the node to each node in the fat-tree network with which the node has a southbound adjacency relationship. However, in some instances, a particular prefix may be unreachable via the southbound adjacency relationships of the node. FIG. 8 illustrates such a scenario. In this example, the link between node 214 and leaf 224 has failed. As a result, prefix 234 and prefix 236 may be unreachable via the southbound adjacency relationships of node 214. If node 212 and node 214 advertise only a default prefix along their southbound adjacency relationships, leaf 222 may route data destined to prefix 234 or prefix 236 through node 214. To prevent this from occurring, the systems and methods described herein may enable node 212 to disaggregate prefixes 234 and 236.

In one example, a node in a fat-tree network may automatically disaggregate a prefix by (1) identifying one or more prefixes that are reachable via the node's southbound adjacency relationships, (2) determining if any of the identified prefixes are not reachable via the southbound adjacency relationships of other nodes that are at the same level as the node, and (3) including any prefixes that are not reachable via the southbound adjacency relationships of other nodes that are at the same level as the node in the distance-vector packets that are transmitted by the node. In one example, a node in a fat-tree network may identify one or more prefixes that are reachable via the node's southbound adjacency relationships using link-state packets received at the node along the node's southbound adjacency relationships. Using FIG. 8 as an example, node 212 may identify prefixes 232, 234, and 236 that are reachable via leaf 222 and leaf 224 using link-state packets received from leaf 222 and leaf 224. After identifying one or more prefixes that are reachable via a node's southbound adjacency relationships, the node may then determine if the identified prefixes are not reachable via the southbound adjacency relationships of one or more other nodes that are at the same level as the node. The node may determine if a prefix is not reachable via the southbound adjacency relationships of another node that is at the same level as the node using (1) a link-state packet of a lower-level node through which the prefix is reachable that indicates that the lower-level node does not have a northbound adjacency relationship with the other node and/or (2) a link-state packet of the other node that was reflected by a lower-level node to the node and that indicates that the prefix is not reachable via the southbound adjacency relationships of the other node. Using FIG. 8 as an example, node 212 may determine that prefixes 234 and 236 are not reachable via the southbound adjacency relationships of node 214 using a link-state packet of leaf 224 that indicates that leaf 224 does not have a northbound adjacency relationship with node 214 or a link-state packet of node 214 that (a) indicates that prefix 234 and prefix 236 are not reachable via the southbound adjacency relationships of node 214, (b) was transmitted from node 214 to leaf 222, and (c) was reflected by leaf 222 to node 212. After determining that prefixes 234 and 236 are not reachable via the southbound adjacency relationships of node 214, node 212 may include prefixes 234 and 236 in the distance-vector packets transmitted by node 212.

In some examples, the systems and methods described herein may load balance the flooding of link-state packets from one level in a fat-tree network to another. As described above, link-state packets may be designated as northbound routing-protocol packets. In some examples, when a node receives a link-state packet from a lower-level node, the node may flood the link-state packet along each of the node's northbound adjacency relationships. In some circumstances, two or more nodes at a particular level in a fat-tree network may have the same southbound adjacency relationships and the same northbound adjacency relationship. As a result, both nodes may receive the link-state packets from the same lower-level nodes and may flood the link-state packets to the same higher-level nodes, and the higher-level nodes may receive duplicate copies of the link-state packets. Using FIG. 2 as an example, nodes 212 and 214 may have the same southbound adjacency relationships (e.g., both have adjacency relationships to leaf 222 and adjacency relationships to leaf 224) and the same northbound adjacency relationships (e.g., both have adjacency relationships to spine 202 and adjacency relationships to spine 204). As such, nodes 212 and 214 may receive link-state packets from both leaf 222 and leaf 224 and may flood these link-state packets to both spine 202 and spine 204, and spine 202 and spine 204 may receive duplicate link-state packets.

In some examples, when two or more nodes at a particular level in a fat-tree network have the same southbound adjacency relationships and the same northbound adjacency relationships, the systems and methods disclosed herein may elect one of the nodes to flood some or all link-state packets in place of the other nodes. Using FIG. 2 as an example, after determining that nodes 212 and 214 have the same southbound adjacency relationships and the same northbound adjacency relationships, the systems and methods disclosed herein may elect node 212 to flood link-state packets received from leaf 222 and leaf 224 to spine 202 and spine 204 and may cause node 214 to refrain from flooding the same. Alternatively, the systems and methods disclosed herein may elect node 212 to flood link-state packets received from leaf 222 to spine 202 and spine 204 and may elect node 214 to flood link-state packets received from leaf 224 to spine 202 and spine 204. In order to determine whether two or more nodes at a particular level in a fat-tree network have the same southbound adjacency relationships and the same northbound adjacency relationship, the systems and methods disclosed herein may use the reflection mechanism described in connection with FIG. 6.

In some examples, the systems and methods described herein may enable policy-based traffic-steering functionalities within a fat-tree network through the use of policy-guided distance-vector packets. As used herein, the term "policy-guided distance-vector packet" generally refers to a distance-vector packet that (1) describes a prefix that is reachable by the node that generated the distance-vector packet, (2) includes a cost that strictly monotonically increases at each hop, and (3) is associated with a policy that determines how the distance-vector packet and/or prefix should be handled by a node that receives the distance-vector packet. In some examples, a policy that is associated with a policy-guided distance-vector packet may indicate that a node that receives the policy-guided distance-vector packets should or should not store the prefix in the routing table of the node, should associate a particular cost with the prefix so that a next-hop node associated with the prefix is more or less preferred, should or should not propagate the policy-guided distance-vector packet, and/or any other suitable action.

In some examples, the systems and methods disclosed herein may use two different types of policy-guided distance-vector packets: northbound policy-guided distance-vector packets that should be sent only from a node at a lower level in a fat-tree network to a node at a higher level in the fat-tree network and southbound policy-guided distance-vector packets that should be sent only from a node at a higher level in the fat-tree network to a node at a lower level in the fat-tree network. In general, when a node receives a northbound policy-guided distance-vector packet, the node may (1) process the northbound policy-guided distance-vector packet according to a policy associated with the northbound policy-guided distance-vector packet, (2) generate an additional northbound policy-guided distance-vector packet with a higher cost than that indicated in the northbound policy-guided distance-vector packet, and (3) transmit the additional northbound policy-guided distance-vector packet along the node's northbound adjacency relationships while refraining from transmitting the additional northbound policy-guided distance-vector packet along the node's southbound adjacency relationships (and the node's east/west adjacency relationships if any exist). Using FIG. 9 as an example, leaf 222 may initially transmit northbound policy-guided distance-vector packet 902. When node 212 receives northbound policy-guided distance-vector packet 902, node 212 may (1) process northbound policy-guided distance-vector packet 902 according to a policy associated with northbound policy-guided distance-vector packet 902, (2) generate northbound policy-guided distance-vector packet 904 from northbound policy-guided distance-vector packet 902 with a higher cost than that indicated in northbound policy-guided distance-vector packet 902, and (3) transmit northbound policy-guided distance-vector packet 904 to spine 202 and spine 204 while refraining from transmitting northbound policy-guided distance-vector packet 904 to leaf 222 or leaf 224. In some examples, if a node receives a northbound policy-guided distance-vector packet from one of its northbound adjacency relationships, the node may simply ignore or drop the packet.

In general, when a node receives a southbound policy-guided distance-vector packet, the node may (1) process the southbound policy-guided distance-vector packet according to a policy associated with the southbound policy-guided distance-vector packet, (2) generate an additional southbound policy-guided distance-vector packet with a higher cost than that indicated in the southbound policy-guided distance-vector packet, and (3) transmit the additional southbound policy-guided distance-vector packet along the node's southbound adjacency relationships while refraining from transmitting the additional southbound policy-guided distance-vector packet along the node's northbound adjacency relationships. Using FIG. 10 as an example, spine 202 may initially transmit southbound policy-guided distance-vector packet 1002. When node 212 receives southbound policy-guided distance-vector packet 1002, node 212 may (1) process southbound policy-guided distance-vector packet 1002 according to a policy associated with southbound policy-guided distance-vector packet 1002, (2) generate southbound policy-guided distance-vector packet 1004 from southbound policy-guided distance-vector packet 1002 with a higher cost than that indicated in southbound policy-guided distance-vector packet 1002, and (3) transmit southbound policy-guided distance-vector packet 1004 to leaf 222 or leaf 224 while refraining from transmitting southbound policy-guided distance-vector packet 1004 to spine 202 and spine 204. In some examples, if a node receives a southbound policy-guided distance-vector packet from one of its southbound adjacency relationships, the node may simply ignore or drop the packet.

As described above, by generally propagating link-state information only towards the spines in a fat-tree network and distance-vector information only towards the leafs in the fat-tree network, embodiments of the instant disclosure may reduce the amount of routing information that must be exchanged and maintained by the nodes in the fat-tree network in order to identify paths within the fat-tree network.

Figure 11:
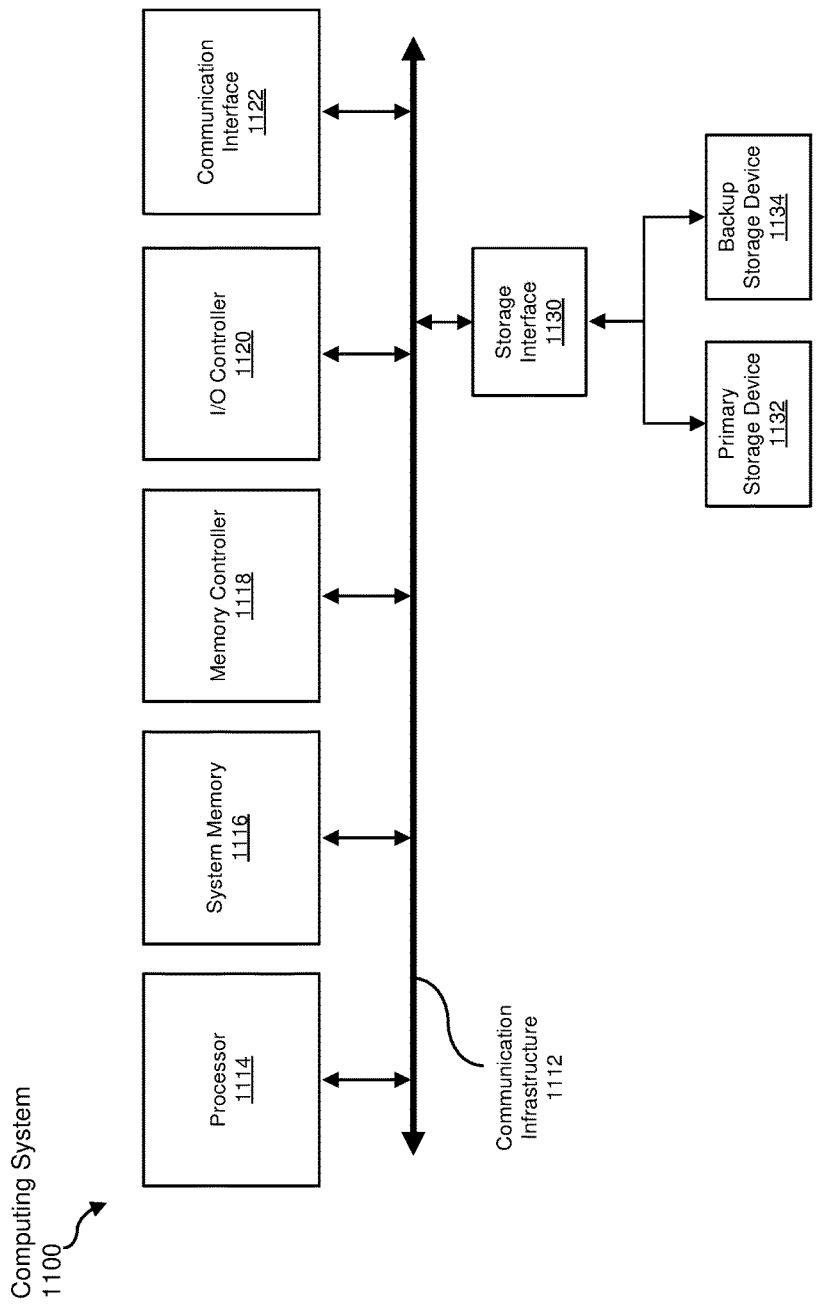
FIG. 11 is a block diagram of an exemplary computing system capable of implementing and/or being used in connection with one or more of the embodiments described and/or illustrated herein.

FIG. 11 is a block diagram of an exemplary computing system 1100 capable of implementing and/or being used in connection with one or more of the embodiments described and/or illustrated herein. In some embodiments, all or a portion of computing system 1100 may perform and/or be a means for performing, either alone or in combination with other elements, one or more of the steps described in connection with FIG. 3. All or a portion of computing system 1100 may also perform and/or be a means for performing and/or implementing any other steps, methods, or processes described and/or illustrated herein. In one example, computing system 1100 may represent an apparatus for distributing routing-protocol packets in fat-tree fabrics.

Computing system 1100 broadly represents any type or form of electrical load, including a single or multi-processor computing device or system capable of executing computer-readable instructions. Examples of computing system 1100 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 1100 may be programmed, configured, and/or otherwise designed to comply with one or more networking protocols. According to certain embodiments, computing system 1100 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 1100 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 1100 may include various network and/or computing components. For example, computing system 1100 may include at least one processor 1114 and a system memory 1116. Processor 1114 generally represents any type or form of processing unit capable of processing data or interpreting and executing instructions. For example, processor 1114 may represent an application-specific integrated circuit (ASIC), a system on a chip (e.g., a network processor), a hardware accelerator, a general purpose processor, and/or any other suitable processing element.

Processor 1114 may process data according to one or more of the networking protocols discussed above. For example, processor 1114 may execute or implement a portion of a protocol stack, may process packets, may perform memory operations (e.g., queuing packets for later processing), may execute end-user applications, and/or may perform any other processing tasks.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1100 may include both a volatile memory unit (such as, for example, system memory 1116) and a non-volatile storage device (such as, for example, primary storage device 1132, as described in detail below). System memory 1116 may be implemented as shared memory and/or distributed memory in a network device. Furthermore, system memory 1116 may store packets and/or other information used in networking operations.

In certain embodiments, exemplary computing system 1100 may also include one or more components or elements in addition to processor 1114 and system memory 1116. For example, as illustrated in FIG. 11, computing system 1100 may include a memory controller 1118, an Input/Output (I/O) controller 1120, and a communication interface 1122, each of which may be interconnected via communication infrastructure 1112. Communication infrastructure 1112 generally represents any type or form of infrastructure capable of facilitating communication between one or more components of a computing device. Examples of communication infrastructure 1112 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 1118 generally represents any type or form of device capable of handling memory or data or controlling communication between one or more components of computing system 1100. For example, in certain embodiments memory controller 1118 may control communication between processor 1114, system memory 1116, and I/O controller 1120 via communication infrastructure 1112. In some embodiments, memory controller 1118 may include a Direct Memory Access (DMA) unit that may transfer data (e.g., packets) to or from a link adapter.

I/O controller 1120 generally represents any type or form of device or module capable of coordinating and/or controlling the input and output functions of a computing device. For example, in certain embodiments I/O controller 1120 may control or facilitate transfer of data between one or more elements of computing system 1100, such as processor 1114, system memory 1116, communication interface 1122, and storage interface 1130.

Communication interface 1122 broadly represents any type or form of communication device or adapter capable of facilitating communication between exemplary computing system 1100 and one or more additional devices. For example, in certain embodiments communication interface 1122 may facilitate communication between computing system 1100 and a private or public network including additional computing systems. Examples of communication interface 1122 include, without limitation, a link adapter, a wired network interface (such as a network interface card), a wireless network interface (such as a wireless network interface card), and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 1122 may also represent a host adapter configured to facilitate communication between computing system 1100 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also enable computing system 1100 to engage in distributed or remote computing. For example, communication interface 1122 may receive instructions from a remote device or send instructions to a remote device for execution.

As illustrated in FIG. 11, exemplary computing system 1100 may also include a primary storage device 1132 and/or a backup storage device 1134 coupled to communication infrastructure 1112 via a storage interface 1130. Storage devices 1132 and 1134 generally represent any type or form of storage device or medium capable of storing data and/or other computer-readable instructions. For example, storage devices 1132 and 1134 may represent a magnetic disk drive (e.g., a so-called hard drive), a solid state drive, a floppy disk drive, a magnetic tape drive, an optical disk drive, a flash drive, or the like. Storage interface 1130 generally represents any type or form of interface or device for transferring data between storage devices 1132 and 1134 and other components of computing system 1100.

In certain embodiments, storage devices 1132 and 1134 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1134 may also include other similar structures or devices for allowing computer software, data, or other computer-readable instructions to be loaded into computing system 1100. For example, storage devices 1132 and 1134 may be configured to read and write software, data, or other computer-readable information. Storage devices 1132 and 1134 may be a part of computing system 1100 or may be separate devices accessed through other interface systems.

Many other devices or subsystems may be connected to computing system 1100. Conversely, all of the components and devices illustrated in FIG. 11 need not be present to practice the embodiments described and/or illustrated herein. The devices and subsystems referenced above may also be interconnected in different ways from those shown in FIG. 11. Computing system 1100 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive a neighbor advertisement to be transformed, transform the neighbor advertisement into an adjacency relationship, output a result of the transformation to a routing-protocol system, use the result of the transformation to determine how to distribute routing-protocol packets, and store the result of the transformation to an adjacency-relationship database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
identifying, at a first node in a clos network, a preconfigured level of the first node in the clos network;
receiving, at the first node from a second node in the clos network, a neighbor advertisement that comprises at least a preconfigured level of the second node in the clos network;
determining, at the first node, that a difference between the preconfigured level of the first node and the preconfigured level of the second node is equal to one;
recording, at the first node based on determining that the difference is equal to one, an adjacency relationship between the first node and the second node;
transmitting a first type of routing-protocol packet from the first node to the second node based at least in part on the adjacency relationship; and
refraining from transmitting a second type of routing-protocol packet from the first node to the second node based at least in part on the adjacency relationship.

2. The method of claim 1, wherein:
the preconfigured level of the first node is one level lower than the preconfigured level of the second node;
the first type of routing-protocol packet comprises link-state packets that each comprises information that describes at least one adjacency relationship of a lower-level node in the clos network that originated the link-state packet and whose preconfigured level is at least one level lower than the preconfigured level of the first node;
transmitting the first type of routing-protocol packet from the first node to the second node comprises:
  receiving, at the first node from a lower-level node in the clos network whose preconfigured level is one level lower than the preconfigured level of the first node, a link-state packet; and
  flooding the link-state packet from the first node to the second node based at least in part on the preconfigured level of the first node being one level lower than the preconfigured level of the second node;
the second type of routing-protocol packet comprises distance-vector packets that each comprises information that describes at least one prefix that is reachable via the first node; and
refraining from transmitting the second type of routing-protocol packet from the first node to the second node comprises:
  generating, at the first node, a distance-vector packet that comprises information that describes at least one prefix that is reachable via the first node;
  transmitting the distance-vector packet to one or more lower-level nodes in the clos network whose preconfigured levels are one level lower than the preconfigured level of the first node; and
  refraining from transmitting the distance-vector packet to the second node based at least in part on the preconfigured level of the first node being one level lower than the preconfigured level of the second node.

3. The method of claim 2, further comprising:
generating, at a third node in the clos network whose preconfigured level is the same as the preconfigured level of the second node, an additional link-state packet that comprises information that describes adjacency relationships of the third node;
transmitting the additional link-state packet from the third node to the first node;
receiving, at the first node from the third node, the additional link-state packet;
flooding the additional link-state packet from the first node to the second node based at least in part on the preconfigured level of the third node being equal to the preconfigured level of the second node; and
refraining from flooding the additional link-state packet to any lower-level node in the clos network whose preconfigured level is one level lower than the preconfigured level of the first node.

4. The method of claim 1, wherein:
the preconfigured level of the first node is one level higher than the preconfigured level of the second node;
the first type of routing-protocol packet comprises distance-vector packets that each comprises information that describes at least one prefix that is reachable via the first node;
transmitting the first type of routing-protocol packet from the first node to the second node comprises:
  generating, at the first node, a distance-vector packet that comprises information that describes at least one prefix that is reachable via the first node;
  transmitting the distance-vector packet to the second node based at least in part on the preconfigured level of the first node being one level higher than the preconfigured level of the second node; and
  refraining from transmitting the distance-vector packet to any higher-level nodes in the clos network whose preconfigured levels are one level higher than the preconfigured level of the first node;
the second type of routing-protocol packet comprises link-state packets that each comprises information that describes at least one adjacency relationship of a lower-level node in the clos network that originated the link-state packet and whose preconfigured level is at least one level lower than the preconfigured level of the first node; and
refraining from transmitting the second type of routing-protocol packet from the first node to the second node comprises:
  receiving, at the first node from a lower-level node in the clos network whose preconfigured level is one level lower than the preconfigured level of the first node, a link-state packet; and
  refraining from flooding the link-state packet to the second node based at least in part on the preconfigured level of the first node being one level higher than the preconfigured level of the second node.

5. The method of claim 4, further comprising:
receiving, at the first node from a third node in the clos network whose preconfigured level is one level lower than the preconfigured level of the first node, a first additional link-state packet that includes information that describes an adjacency relationship between the third node and a fourth node in the clos network whose preconfigured level is equal to the preconfigured level of the first node;
receiving, at the first node from the second node, a second additional link-state packet that:

does not include information that describes an adjacency relationship between the second node and the fourth node; and includes information that describes a prefix that is reachable via the second node, wherein the first additional link-state packet received from the third node does not include information that indicates that the prefix is reachable via the third node;

determining that the prefix is not reachable through the fourth node based at least in part on the absence, in the second additional link-state packet, of information that describes an adjacency relationship between the second node and the fourth node; and transmitting, in response to determining that the prefix is not reachable through the fourth node, an additional distance-vector packet from the first node to the third node that indicates that the prefix is reachable via the first node, wherein the third node is configured to route traffic using longest-prefix matching.

6. The method of claim 4, further comprising:

receiving, at the first node from a lower-level node in the clos network whose preconfigured level is one level lower than the preconfigured level of the first node, a first additional link-state packet that:

originated from a same-level node in the clos network whose preconfigured level is equal to the preconfigured level of the first node;

was reflected by the lower-level node to the first node;

includes information that describes each northbound adjacency relationship of the same-level node; and includes information that describes each southbound adjacency relationship of the same-level node;

forming a flooding partnership between the first node and the same-level node in response to determining that:

the same-level node and the first node have the same northbound adjacency relationships; and the same-level node and the first node have the same southbound adjacency relationships;

receiving, at the first node from the lower-level node, a second additional link-state packet that:

originated from the lower-level node; and includes information that describes each adjacency relationship of the lower-level node;

determining, based at least in part on the flooding partnership, that the same-level node will flood the second additional link-state packet to a higher-level node in the clos network whose preconfigured level is one level higher than the preconfigured level of the first node; and refraining, at the first node based at least in part on determining that the same-level node will flood the second additional link-state packet to the higher-level node, from flooding the second additional link-state packet to the higher-level node.

7. The method of claim 1, wherein:

the preconfigured level of the first node is one level lower than the preconfigured level of the second node;

the first type of routing-protocol packet comprises northbound policy-guided distance-vector packets that each comprises:

information that describes at least one prefix that is reachable via a lower-level node in the clos network from which the northbound policy-guided distance-vector packet was received and whose preconfigured level is at least one level lower than the preconfigured level of the first node;

information that indicates a policy; and a cost to the prefix; and transmitting the first type of routing-protocol packet from the first node to the second node comprises:

receiving, at the first node from any lower-level node in the clos network whose preconfigured level is one level lower than the preconfigured level of the first node, a first northbound policy-guided distance-vector packet;

applying, at the first node, the policy to the first northbound policy-guided distance-vector packet;

generating a second northbound policy-guided distance-vector packet from the first northbound policy-guided distance-vector packet;

transmitting the second northbound policy-guided distance-vector packet from the first node to the second node based at least in part on the preconfigured level of the first node being one level lower than the preconfigured level of the second node; and refraining from transmitting the second northbound policy-guided distance-vector packet to any lower-level node in the clos network whose preconfigured level is one level lower than the preconfigured level of the first node.

8. The method of claim 1, wherein:

the preconfigured level of the first node is one level higher than the preconfigured level of the second node;

the first type of routing-protocol packet comprises southbound policy-guided distance-vector packets that each comprises:

information that describes at least one prefix that is reachable via a higher-level node in the clos network from which the southbound policy-guided distance-vector packet was received and whose preconfigured level is one level higher than the preconfigured level of the first node;

information that indicates a policy; and a cost to the prefix; and transmitting the first type of routing-protocol packet from the first node to the second node comprises:

receiving, at the first node from any higher-level node in the clos network whose preconfigured level is one level higher than the preconfigured level of the first node, a first southbound policy-guided distance-vector packet;

applying, at the first node, the policy to the first southbound policy-guided distance-vector packet;

generating a second southbound policy-guided distance-vector packet from the first southbound policy-guided distance-vector packet;

transmitting the second southbound policy-guided distance-vector packet from the first node to the second node based at least in part on the preconfigured level of the first node being one level higher than the preconfigured level of the second node; and refraining from transmitting the second southbound policy-guided distance-vector packet to any higher-level node in the clos network whose preconfigured level is one level higher than the preconfigured level of the first node.

9. The method of claim 1, wherein the clos network comprises a fat-tree network.

10. A system comprising:

an identifying module, stored in memory, that identifies, at a first node in a clos network, a preconfigured level of the first node in the clos network;

a receiving module, stored in memory, that receives, at the first node from a second node in the clos network, a neighbor advertisement that comprises at least a preconfigured level of the second node in the clos network;
a determining module, stored in memory, that determines, at the first node, that a difference between the preconfigured level of the first node and the preconfigured level of the second node is equal to one;
a recording module, stored in memory, that records, at the first node based on determining that the difference is equal to one, an adjacency relationship between the first node and the second node;
a transmitting module, stored in memory, that:
  transmits a first type of routing-protocol packet from the first node to the second node based at least in part on the adjacency relationship; and
  refrains from transmitting a second type of routing-protocol packet from the first node to the second node based at least in part on the adjacency relationship; and
at least one physical processor that executes the identifying module, the receiving module, the determining module, the recording module, and the transmitting module.

11. The system of claim 10, wherein:
the preconfigured level of the first node is one level lower than the preconfigured level of the second node;
the first type of routing-protocol packet comprises link-state packets that each comprises information that describes at least one adjacency relationship of a lower-level node in the clos network that originated the link-state packet and whose preconfigured level is at least one level lower than the preconfigured level of the first node;
the receiving module further receives, at the first node from a lower-level node in the clos network whose preconfigured level is one level lower than the preconfigured level of the first node, a link-state packet;
the transmitting module transmits the first type of routing-protocol packet from the first node to the second node by flooding the link-state packet from the first node to the second node based at least in part on the preconfigured level of the first node being one level lower than the preconfigured level of the second node;
the second type of routing-protocol packet comprises distance-vector packets that each comprises information that describes at least one prefix that is reachable via the first node;
the system further comprises a generating module, stored in memory that generates, at the first node, a distance-vector packet that comprises information that describes at least one prefix that is reachable via the first node; and
the transmitting module refrains from transmitting the second type of routing-protocol packet from the first node to the second node by:
  transmitting the distance-vector packet to one or more lower-level nodes in the clos network whose preconfigured levels are one level lower than the preconfigured level of the first node; and
  refraining from transmitting the distance-vector packet to the second node based at least in part on the preconfigured level of the first node being one level lower than the preconfigured level of the second node.

12. The system of claim 11, wherein:
the generating module further generates, at a third node in the clos network whose preconfigured level is the same as the preconfigured level of the second node, an additional link-state packet that comprises information that describes adjacency relationships of the third node;
the transmitting module further transmits the additional link-state packet from the third node to the first node;
the receiving module further receives, at the first node from the third node, the additional link-state packet; and
the transmitting module further:
  floods the additional link-state packet from the first node to the second node based at least in part on the preconfigured level of the third node being equal to the preconfigured level of the second node; and
  refrains from flooding the additional link-state packet to any lower-level node in the clos network whose preconfigured level is one level lower than the preconfigured level of the first node.

13. The system of claim 10, wherein:
the preconfigured level of the first node is one level higher than the preconfigured level of the second node;
the first type of routing-protocol packet comprises distance-vector packets that each comprises information that describes at least one prefix that is reachable via the first node;
the system further comprises a generating module, stored in memory, that generates, at the first node, a distance-vector packet that comprises information that describes at least one prefix that is reachable via the first node;
the transmitting module transmits the first type of routing-protocol packet from the first node to the second node by:
  transmitting the distance-vector packet to the second node based at least in part on the preconfigured level of the first node being one level higher than the preconfigured level of the second node; and
  refraining from transmitting the distance-vector packet to any higher-level nodes in the clos network whose preconfigured levels are one level higher than the preconfigured level of the first node;
the second type of routing-protocol packet comprises link-state packets that each comprises information that describes at least one adjacency relationship of a lower-level node in the clos network that originated the link-state packet and whose preconfigured level is at least one level lower than the preconfigured level of the first node;
the receiving module further receives, at the first node from a lower-level node in the clos network whose preconfigured level is one level lower than the preconfigured level of the first node, a link-state packet; and
the transmitting module refrains from transmitting the second type of routing-protocol packet from the first node to the second node by refraining from flooding the link-state packet to the second node based at least in part on the preconfigured level of the first node being one level higher than the preconfigured level of the second node.

14. The system of claim 13, wherein:
the receiving module further receives, at the first node from a third node in the clos network whose preconfigured level is one level lower than the preconfigured level of the first node, a first additional link-state packet that includes information that describes an adjacency relationship between the third node and a fourth node in the clos network whose preconfigured level is equal to the preconfigured level of the first node;

the receiving module further receives, at the first node from the second node, a second additional link-state packet that:
  does not include information that describes an adjacency relationship between the second node and the fourth node; and
  includes information that describes a prefix that is reachable via the second node, wherein the first additional link-state packet received from the third node does not include information that indicates that the prefix is reachable via the third node;
the determining module further determines that the prefix is not reachable through the fourth node based at least in part on the absence, in the second additional link-state packet, of information that describes an adjacency relationship between the second node and the fourth node;
the generating module further generates an additional distance-vector packet that indicates that the prefix is reachable via the first node; and
the transmitting module further transmits, in response to determining that the prefix is not reachable through the fourth node, the additional distance-vector packet from the first node to the third node, wherein the third node is configured to route traffic using longest-prefix matching.

15. The system of claim 13, wherein:
the receiving module further receives, at the first node from a lower-level node in the clos network whose preconfigured level is one level lower than the preconfigured level of the first node, a first additional link-state packet that:
  originated from a same-level node in the clos network whose preconfigured level is equal to the preconfigured level of the first node;
  was reflected by the lower-level node to the first node;
  includes information that describes each northbound adjacency relationship of the same-level node; and
  includes information that describes each southbound adjacency relationship of the same-level node;
the determining module further forms a flooding partnership between the first node and the same-level node in response to determining that:
  the same-level node and the first node have the same northbound adjacency relationships; and
  the same-level node and the first node have the same southbound adjacency relationships;
the receiving module further receives, at the first node from the lower-level node, a second additional link-state packet that:
  originated from the lower-level node; and
  includes information that describes each adjacency relationship of the lower-level node;
the determining module further determines, based at least in part on the flooding partnership, that the same-level node will flood the second additional link-state packet to a higher-level node in the clos network whose preconfigured level is one level higher than the preconfigured level of the first node; and
the transmitting module further refrains, at the first node based at least in part on determining that the same-level node will flood the second additional link-state packet to the higher-level node, from flooding the second additional link-state packet to the higher-level node.

16. The system of claim 10, wherein:
the preconfigured level of the first node is one level lower than the preconfigured level of the second node;
the first type of routing-protocol packet comprises northbound policy-guided distance-vector packets that each comprises:
  information that describes at least one prefix that is reachable via a lower-level node in the clos network from which the northbound policy-guided distance-vector packet was received and whose preconfigured level is at least one level lower than the preconfigured level of the first node;
  information that indicates a policy; and
  a cost to the prefix;
the receiving module further receives, at the first node from any lower-level node in the clos network whose preconfigured level is one level lower than the preconfigured level of the first node, a first northbound policy-guided distance-vector packet;
the determining module further applies, at the first node, the policy to the first northbound policy-guided distance-vector packet;
the generating module further generates a second northbound policy-guided distance-vector packet from the first northbound policy-guided distance-vector packet; and
the transmitting module transmits the first type of routing-protocol packet from the first node to the second node by:
  transmitting the second northbound policy-guided distance-vector packet from the first node to the second node based at least in part on the preconfigured level of the first node being one level lower than the preconfigured level of the second node; and
  refraining from transmitting the second northbound policy-guided distance-vector packet to any lower-level node in the clos network whose preconfigured level is one level lower than the preconfigured level of the first node.

17. The system of claim 10, wherein:
the preconfigured level of the first node is one level higher than the preconfigured level of the second node;
the first type of routing-protocol packet comprises southbound policy-guided distance-vector packets that each comprises:
  information that describes at least one prefix that is reachable via a higher-level node in the clos network from which the southbound policy-guided distance-vector packet was received and whose preconfigured level is one level higher than the preconfigured level of the first node;
  information that indicates a policy; and
  a cost to the prefix;
the receiving module further receives, at the first node from any higher-level node in the clos network whose preconfigured level is one level higher than the preconfigured level of the first node, a first southbound policy-guided distance-vector packet;
the determining module further applies, at the first node, the policy to the first southbound policy-guided distance-vector packet;
the generating module further generates a second southbound policy-guided distance-vector packet from the first southbound policy-guided distance-vector packet; and
the transmitting module transmits the first type of routing-protocol packet from the first node to the second node by:
  transmitting the second southbound policy-guided distance-vector packet from the first node to the second node based at least in part on the preconfigured level of the first node being one level higher than the preconfigured level of the second node; and refraining from transmitting the second southbound policy-guided distance-vector packet to any higher-level node in the clos network whose preconfigured level is one level higher than the preconfigured level of the first node.

18. An apparatus comprising:

a storage device that stores routing-protocol information; and at least one physical processor communicatively coupled to the storage device at a first node within a clos network, wherein the physical processor:

identifies, at the first node in the clos network, a preconfigured level of the first node in the clos network;

receives, at the first node from a second node in the clos network, a neighbor advertisement that comprises at least a preconfigured level of the second node in the clos network;

determines, at the first node, that a difference between the preconfigured level of the first node and the preconfigured level of the second node is equal to one;

records, to the storage device at the first node based on determining that the difference is equal to one, an adjacency relationship between the first node and the second node;

transmits a first type of routing-protocol packet from the first node to the second node based at least in part on the adjacency relationship; and refrains from transmitting a second type of routing-protocol packet from the first node to the second node based at least in part on the adjacency relationship.

19. The apparatus of claim 18, wherein:

the preconfigured level of the first node is one level lower than the preconfigured level of the second node;

the first type of routing-protocol packet comprises link-state packets that each comprises information that describes at least one adjacency relationship of a lower-level node in the clos network that originated the link-state packet and whose preconfigured level is at least one level lower than the preconfigured level of the first node;

the physical processor transmits the first type of routing-protocol packet from the first node to the second node by:

receiving, at the first node from a lower-level node in the clos network whose preconfigured level is one level lower than the preconfigured level of the first node, a link-state packet; and flooding the link-state packet from the first node to the second node based at least in part on the preconfigured level of the first node being one level lower than the preconfigured level of the second node;

the second type of routing-protocol packet comprises distance-vector packets that each comprises information that describes at least one prefix that is reachable via the first node; and the physical processor refrains from transmitting the second type of routing-protocol packet from the first node to the second node by:

generating, at the first node, a distance-vector packet that comprises information that describes at least one prefix that is reachable via the first node;

transmitting the distance-vector packet to one or more lower-level nodes in the clos network whose preconfigured levels are one level lower than the preconfigured level of the first node; and refraining from transmitting the distance-vector packet to the second node based at least in part on the preconfigured level of the first node being one level lower than the preconfigured level of the second node.

20. The apparatus of claim 18, wherein:

the preconfigured level of the first node is one level higher than the preconfigured level of the second node;

the first type of routing-protocol packet comprises distance-vector packets that each comprises information that describes at least one prefix that is reachable via the first node;

the physical processor transmits the first type of routing-protocol packet from the first node to the second node by:

generating, at the first node, a distance-vector packet that comprises information that describes at least one prefix that is reachable via the first node;

transmitting the distance-vector packet to the second node based at least in part on the preconfigured level of the first node being one level higher than the preconfigured level of the second node; and refraining from transmitting the distance-vector packet to any higher-level nodes in the clos network whose preconfigured levels are one level higher than the preconfigured level of the first node;

the second type of routing-protocol packet comprises link-state packets that each comprises information that describes at least one adjacency relationship of a lower-level node in the clos network that originated the link-state packet and whose preconfigured level is at least one level lower than the preconfigured level of the first node; and the physical processor refrains from transmitting the second type of routing-protocol packet from the first node to the second node by:

receiving, at the first node from a lower-level node in the clos network whose preconfigured level is one level lower than the preconfigured level of the first node, a link-state packet; and refraining from flooding the link-state packet to the second node based at least in part on the preconfigured level of the first node being one level higher than the preconfigured level of the second node.

* * * * *